US008210605B2

(12) United States Patent
Hough et al.

(10) Patent No.: US 8,210,605 B2
(45) Date of Patent: Jul. 3, 2012

(54) HOLSTER FOR PORTABLE IFE DEVICE

(75) Inventors: Ray Hough, Bedfordshire (GB); Martin Ian Dickinson, Northampton (GB)

(73) Assignee: BE Aerospace, Inc., Wellington, FL (US)

( * ) Notice: Subject to any disclaimer, the term of this patent is extended or adjusted under 35 U.S.C. 154(b) by 1241 days.

(21) Appl. No.: 11/688,389

(22) Filed: Mar. 20, 2007

(65) Prior Publication Data

US 2007/0222248 A1 Sep. 27, 2007

Related U.S. Application Data (60) Provisional application No. 60/743,600, filed on Mar. 21, 2006.

(51) Int. Cl.
*A47C 7/62* (2006.01)
(52) U.S. Cl. .................................. 297/188.05; 297/217.3
(58) Field of Classification Search ............ 297/188.04, 297/188.05, 188.07, 217.3
See application file for complete search history.

(56) References Cited

U.S. PATENT DOCUMENTS

| | | | |
|---|---|---|---|
| 1,276,713 A * | 8/1918 | Biedma ......................... 297/164 |
| 3,235,305 A * | 2/1966 | Dlouhy et al. ........... 297/188.05 |
| 4,647,980 A | 3/1987 | Steventon et al. |
| 4,756,528 A | 7/1988 | Umashankar |
| 5,311,302 A | 5/1994 | Berry et al. |
| 6,199,810 B1 * | 3/2001 | Wu et al. ..................... 248/291.1 |
| 6,279,992 B1 * | 8/2001 | Plocher et al. ................ 297/146 |
| 6,619,605 B2 | 9/2003 | Lambert |
| 6,663,155 B1 | 12/2003 | Malone et al. |
| 6,698,832 B2 | 3/2004 | Boudinot |
| 6,994,236 B2 * | 2/2006 | Hsu ............................... 224/275 |
| 7,040,699 B2 | 5/2006 | Curran et al. |
| 7,070,237 B2 | 7/2006 | Rochel |
| 7,104,599 B2 * | 9/2006 | Berger et al. ................. 297/163 |
| 7,201,356 B2 * | 4/2007 | Huang ........................ 248/309.1 |
| 2004/0032543 A1 | 2/2004 | Chang |
| 2004/0227372 A1 | 11/2004 | Lavelle |
| 2005/0204596 A1 * | 9/2005 | Peng .............................. 40/320 |
| 2005/0242638 A1 * | 11/2005 | Vitito ......................... 297/217.3 |
| 2006/0047426 A1 | 3/2006 | Vitito |
| 2007/0001492 A1 * | 1/2007 | Chang ....................... 297/217.3 |
| 2007/0057541 A1 * | 3/2007 | Huang ....................... 297/217.3 |

FOREIGN PATENT DOCUMENTS

WO  WO 2004028861 A2  4/2004

OTHER PUBLICATIONS

Supplementary European Search Report Issued by the European Patent Office on Oct. 28, 2010 for EP07758975.2.

* cited by examiner

*Primary Examiner* — Sarah B McPartlin
(74) *Attorney, Agent, or Firm* — Shumaker, Loop & Kendrick, LLP (57) ABSTRACT

A holster for a passenger seat has a rear face and a peripheral wall which defines a pocket for receiving an IFE device. The holster is moveable between stowed and deployed positions. In the deployed position, an IFE device may be positioned in the pocket for convenient viewing. The tilt angle of the holster may also be adjusted. A method of viewing an IFE device is also disclosed.

13 Claims, 7 Drawing Sheets

HOLSTER FOR PORTABLE IFE DEVICE

This application claims priority to U.S. Provisional Pat. No. 60/743,600 filed on Mar. 21, 2006.

BACKGROUND OF THE INVENTION

This invention relates generally to aircraft passenger seating and more particularly to in-flight entertainment devices for passenger seats.

Commercial passenger aircraft often include in-flight entertainment (IFE) devices for use by passengers. Typically, an IFE device has a video display along with speakers for audio output and user controls. While some IFE devices are built into the aircraft, others are configured as portable "tablets" with self-contained data storage and playback functions (e.g., digital video, DVD, videotape, etc.).

These portable IFE devices are currently used by placing them on the meal tray in front of the passenger using an easel-type support. However, this arrangement is inconvenient if the passenger wants to eat while using the IFE device, and the IFE device is also in the passenger's way when not in use.

Accordingly, there is a need for an apparatus to mount a portable IFE device in a convenient position for a vehicle passenger.

SUMMARY OF THE INVENTION

Therefore, it is an object of the invention to provide an apparatus for mounting a portable IFE device in a convenient position for a vehicle passenger.

It is another object of the invention to provide an apparatus for viewing an IFE device behind a passenger airplane seat.

It is another object of the invention to provide an apparatus for viewing an IFE device that can be stowed in the back of an airplane passenger seat.

It is another object of the invention to provide an apparatus for viewing an IFE device that can be adjusted.

These and other objects of the invention are achieved in the preferred embodiments disclosed below by providing an apparatus for attachment to the back of a passenger airplane seat for retaining an in-flight entertainment device in a viewable position. The apparatus includes a holster tiltable about an axis from a stowed position in a recess in the seat to a deployed position exposing a pocket for receiving the in-flight entertainment device and a frame surrounding the holster and matingly insertable into a housing on the back of the seat for stowing the holster. The frame and housing are connectable to retain the frame in a stationary position with respect to the housing yet permit adjustment of the frame about another axis for selectively changing the tilt or pitch angle of the holster.

According to a preferred embodiment of the invention, the pocket is defined by a peripheral wall.

According to another preferred embodiment of the invention, the housing includes a slot.

According to another preferred embodiment of the invention, the frame includes an opening aligned with the slot.

According to another preferred embodiment of the invention, the frame is pivotally attached at its top to the housing.

According to another preferred embodiment of the invention, the apparatus includes a flexible latch having a protruding tab for retaining the holster in the stowed position.

According to another preferred embodiment of the invention, the apparatus includes a finger well for accessing the latch to deploy the holster.

According to another preferred embodiment of the invention, an apparatus for retaining an in-flight entertainment device behind an airplane seat includes a frame surrounding a holster including a peripheral wall defining a pocket for receiving the in-flight entertainment device, an outer housing for receiving the frame, a pivot connection between the frame and the holster for deploying the holster, a pivot connection between the frame and the seat for adjusting the tilt or pitch angle of the holster.

According to another preferred embodiment of the invention, the apparatus includes a rear face that fits substantially flush with a back surface of the seat.

According to another preferred embodiment of the invention, the lower end of the frame defines a recess in the seat for receiving the holster.

According to another preferred embodiment of the invention, the outer housing includes a slot.

According to another preferred embodiment of the invention, the frame includes an opening.

According to another preferred embodiment of the invention, the slot in the outer housing aligns with the opening in the frame.

According to another preferred embodiment of the invention, a fastener extends through the slot and the opening for retaining the holster at a tilt or pitch angle.

According to another preferred embodiment of the invention, the apparatus includes a latch for retaining the holster in a stowed position.

According to another preferred embodiment of the invention, a method of viewing an in-flight entertainment device including the step of providing an airplane seat including a frame surrounding a holster including a peripheral wall defining a pocket for receiving the in-flight entertainment device, an outer housing for receiving the frame, a pivot connection between the frame and the holster for deploying the holster, and a pivot connection for adjusting the tilt or pitch angle of the holster. The method further includes the step of deploying the holster by releasing a latch and pivoting the holster about the pivot connection for deploying the holster, inserting an in-flight entertainment device into the holster, and adjusting the tilt or pitch of the holster by pivoting the frame about the pivot connection for adjusting the tilt or pitch angle of the holster.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
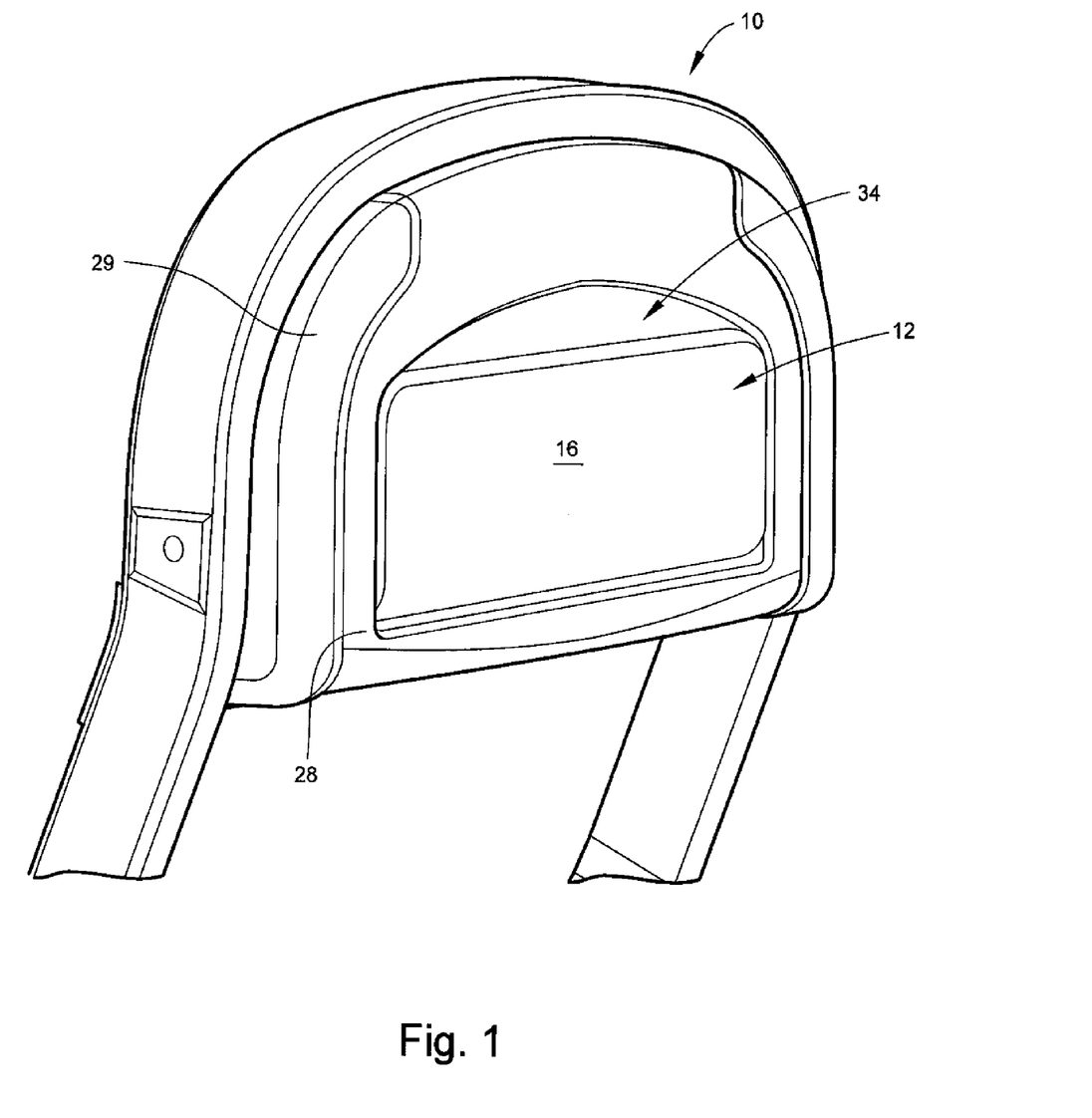
FIG. 1 is a perspective view of a passenger seat including an IFE device holster constructed in accordance with the present invention, in a stowed position.
Figure 2:
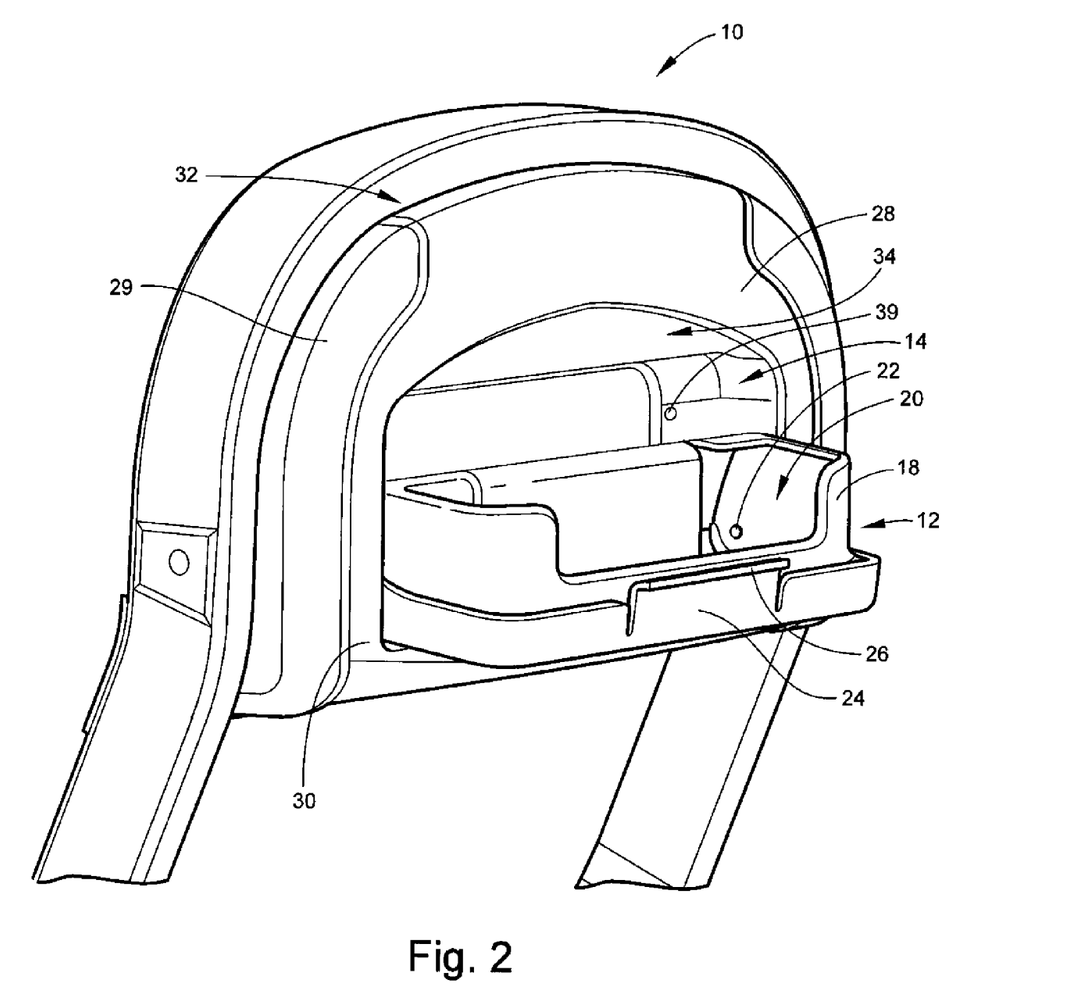
FIG. 2 is a perspective view of the IFE device holster of FIG. 1 in a deployed position.

Referring to the drawings wherein identical reference numerals denote the same elements throughout the various views, an upper portion of a seat back for an aircraft passenger seat 10 is illustrated in FIGS. 1 and 2. It will be understood that the seat 10 includes a seat bottom and other conventional components not illustrated here. The present invention is equally applicable for use with other kinds of passenger seating, for example seating used in trains or other vehicles.

An in-flight entertainment or "IFE" holster 12 is mounted to the rear of the seat 10 near its upper end, in a recess 14. The IFE holster 12 has a rear face 16 and a peripheral wall 18 which defines a pocket 20 for receiving an IFE device. The IFE holster 12 is moveable between a stowed position, shown in FIG. 1, and a deployed position, shown in FIG. 2. Pivots 22 may be provided for this purpose. In the illustrated example the IFE holster 12 includes a flexible latch 24 with a protruding tab 26, which serves to lock the IFE holster 12 in the stowed position.

Means may be provided for changing the tilt or "pitch" angle of the IFE holster 12. In the illustrated example, a frame 28 surrounds the IFE holster 12. The lower end 30 of the frame 28 defines the recess 14 that receives the holster 12, while the upper end 32 is mounted to the seat 10 so that it can pivot about a transverse axis. The frame 28 is shown mounted in an outer housing 29, but could alternatively be attached directly to the seat 10.

When the IFE holster 12 is not in use, the rear face 16 fits substantially flush against the back surface of the seat 10. In this stowed position, its appearance fits in with the overall visual design of the seat 10 and does not occupy space allotted to a passenger behind the seat 10. The rear face 16 is free of any substantial protrusions or sharp corners that could increase the risk of head injuries to the rear-seated passenger during a crash.

Figure 3:
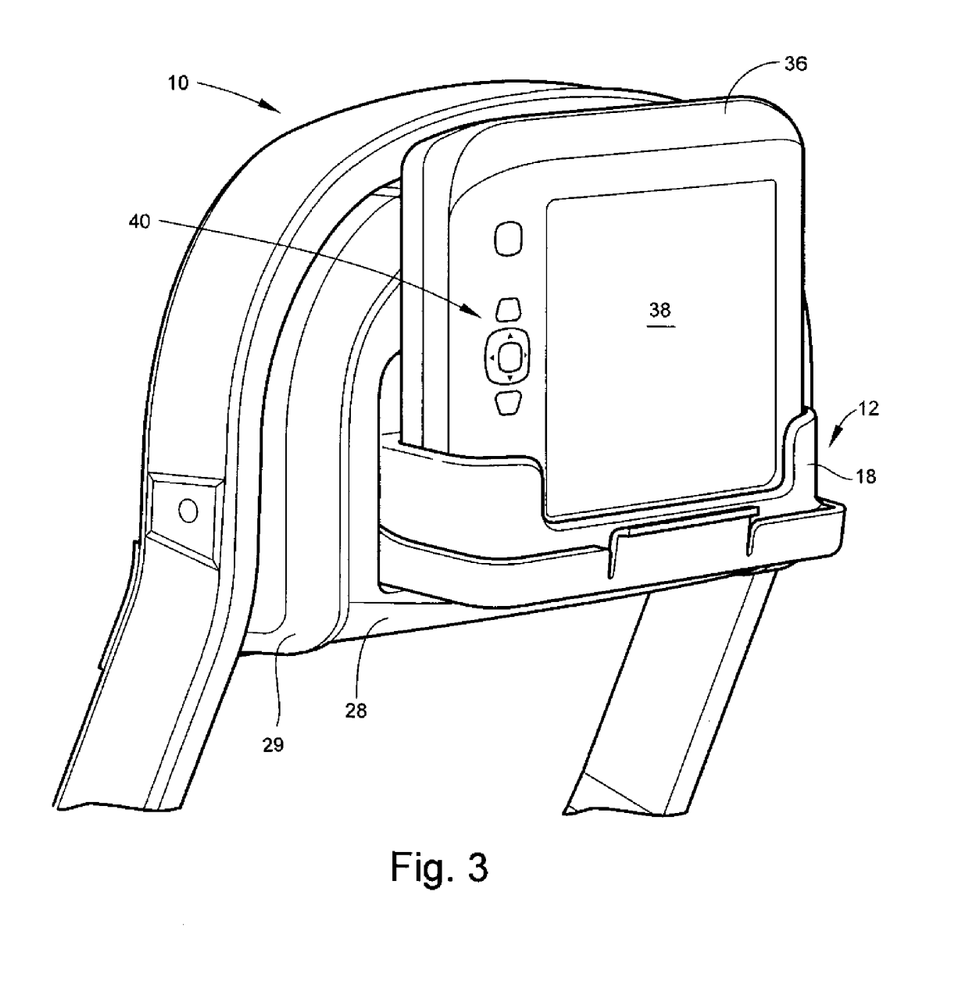
FIG. 3 is a perspective view of the IFE device holster of FIG. 2 with an IFE device placed therein.

To use the IFE holster 12, it is first moved to the deployed position. This is accomplished by inserting a user's fingers in a finger well 34 which is adjacent the recess 14, and depressing the latch 24, which pulls the tab 26 clear of a locking slot in the recess 14. The IFE holster 12 may then be rotated down until the pocket 20 is exposed (see FIG. 2). With the IFE holster 12 deployed, an IFE device 36 is inserted into the pocket 20, which holds it in place for viewing by a passenger (see FIG. 3).

The IFE device 36 has a housing that includes an exposed screen 38 and user controls 40. In the illustrated example, the IFE device 36 includes internal data storage and hardware for playback of motion picture or video content on the screen 38. The exact configuration of the IFE device 36 is not critical, and the holster 12 may be used with various sizes and shapes of IFE devices. It may also be used with IFE devices that require some sort of connection to the vehicle systems (e.g. video feed or electrical power).

In the illustrated example, the peripheral wall 18 is cut away to allow viewing of the entire screen 38. The pocket 20 may be shaped and sized to snugly hold the IFE device 36 in place, or an insert (not shown) such as resilient foam or a custom-molded liner may be provided to adapt a standardized pocket shape to different IFE devices.

Figure 4:
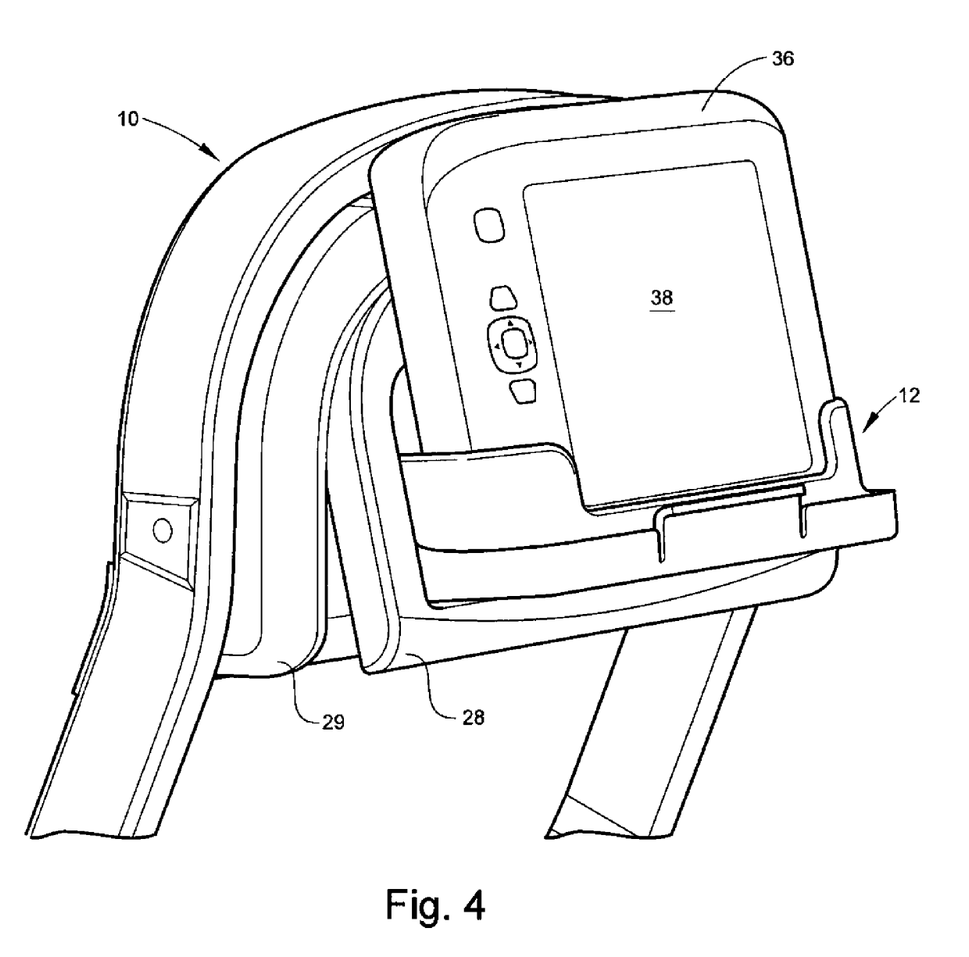
FIG. 4 is a perspective view of the IFE device holster of FIG. 3 shown in a tilted position.
Figure 5:
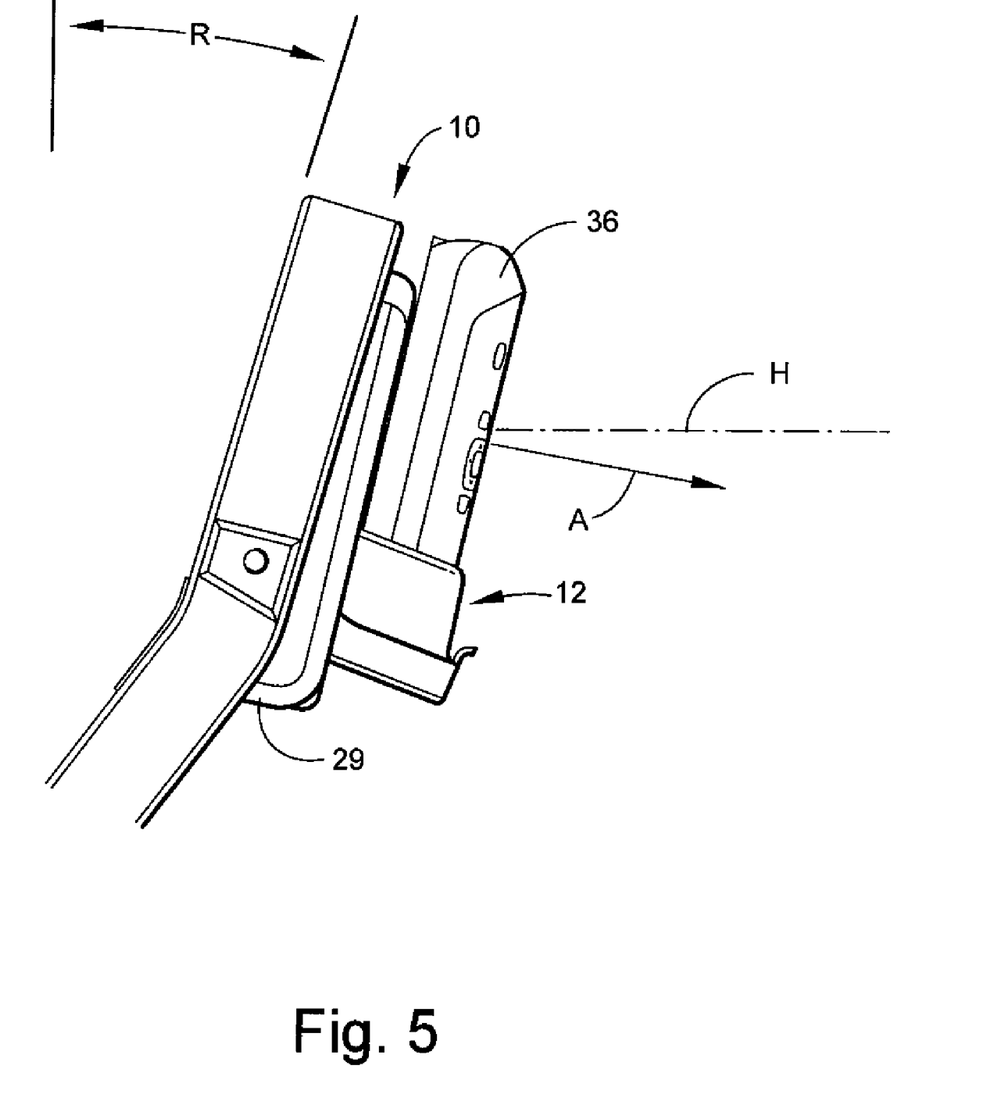
FIG. 5 is a side view of a portion of a seat in a reclined position with an IFE device mounted thereto.
Figure 6:
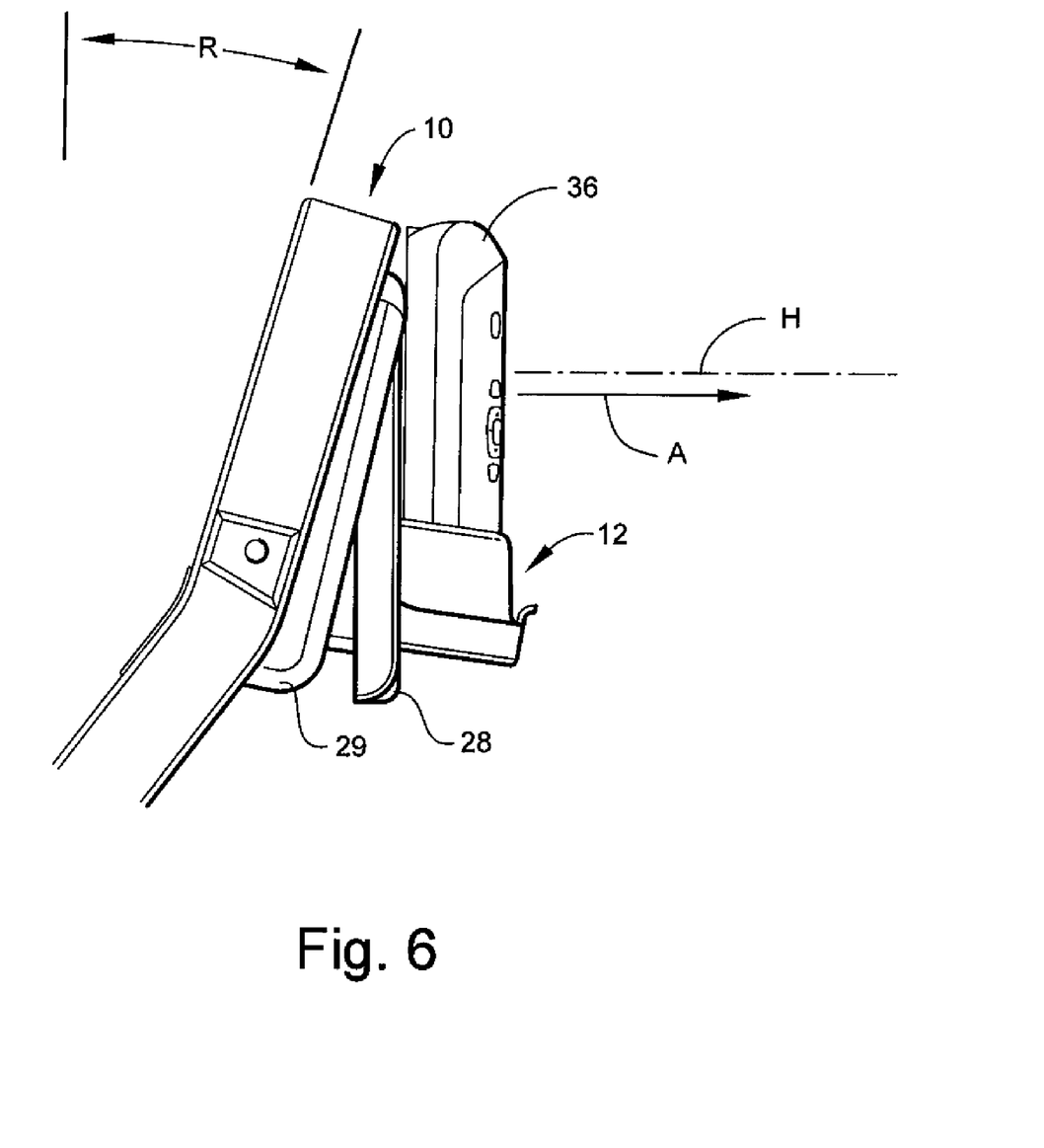
FIG. 6 is a side view of the seat of FIG. 5 with the IFE device tilted upward.
Figure 7:
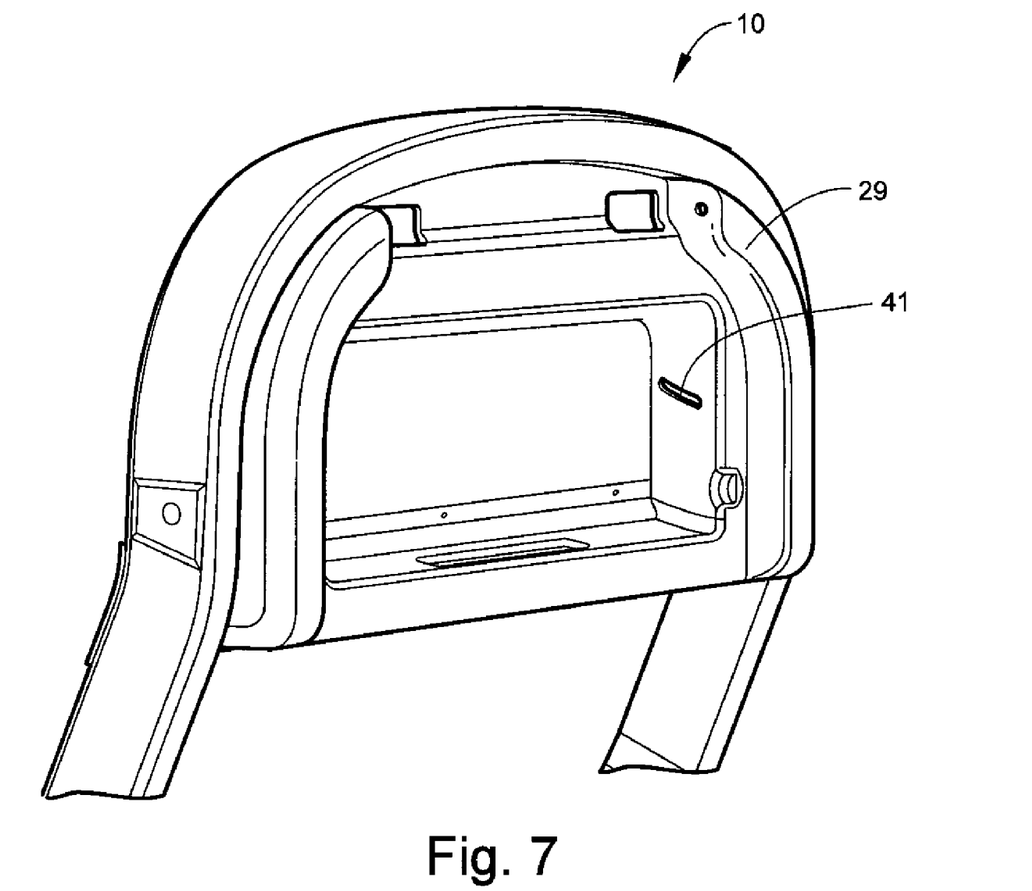
FIG. 7 is a perspective view of the seat of FIG. 1 with a frame of the IFE device holster removed to show an outer housing.

When the seat 10 is reclined, the IFE device 36 will tilt with it. Known seat recline angles, indicated at "R" in FIG. 5, can cause the central axis "A" of the screen 38 to point downwards relative to a horizontal reference line "H". Many known types of screens 38 have a limit to their acceptable off-axis viewing angle, and therefore this tilting is undesirable. Accordingly, after the IFE device 36 is inserted, the frame 28 may be tilted to alter the angle of the screen 38, specifically to point its axis A more upwards relative to the horizontal reference H and counter the effects of the seat recline. The tilted IFE holster 12 is shown in FIGS. 4 and 7. Means such as a latch or friction mechanism may be provided to hold the frame 28 at a desired tilt angle. In the illustrated example, a hole 39 in the frame 28 (see FIG. 2) aligns with a slot 41 in the outer housing 29 (see FIG. 7). The frame 28 and the outer housing 29 are then clamped together with a screw, nylon friction washers, and a nut (not shown). This arrangement provides enough friction to hold the screen at the desired angle when the seat 10 is reclined, while still allowing intentional adjustment of the tilt angle by a passenger.

The foregoing has described a holster for an IFE device. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. An apparatus adapted for attachment to the back of a passenger airplane seat and for retaining an in-flight entertainment device in a viewable position comprising: a holster moveable between a stowed position and a deployed position exposing a pocket defined by the holster for receiving the in-flight entertainment device in the viewable position, a frame surrounding the holster and matingly insertable into a housing on the back of the seat for stowing the holster, the frame and housing connectable to retain the frame within the housing yet permit adjustment of the frame about a transverse axis for selectively changing the tilt or pitch angle of the holster.

2. The apparatus according to claim 1 wherein the pocket is defined by a peripheral wall.

3. The apparatus according to claim 1 wherein the housing comprises a slot.

4. The apparatus according to claim 1 wherein the frame is pivotally attached at its top to the housing.

5. The apparatus according to claim 1 further comprising a flexible latch having a protruding tab for retaining the holster in the stowed position.

6. The apparatus according to claim 5 further comprising a finger well for accessing the latch to deploy the holster.

7. An apparatus for retaining an in-flight entertainment device behind an airplane seat comprising:
   (a) a frame surrounding a holster comprising a peripheral wall defining a pocket for receiving the in-flight entertainment device in a viewable position;
   (b) an outer housing for receiving the frame;
   (c) a pivot connection between the frame and the holster for deploying the holster between a stowed position and a deployed position exposing the pocket with the in-flight entertainment device in the viewable position; and
   (d) a pivot connection between the frame and the seat for adjusting the tilt or pitch angle of the holster.

8. The apparatus according to claim 7 wherein the holster further comprises a rear face that fits substantially flush with a back surface of the seat.

9. The apparatus according to claim 7 wherein the lower end of the frame defines a recess in the seat for receiving the holster.

10. The apparatus according to claim 7 wherein the outer housing comprises a slot.

11. The apparatus according to claim 10 wherein the frame comprises an opening.

12. The apparatus according to claim 7 further comprising a latch for retaining the holster in a stowed position.

13. A method of viewing an in-flight entertainment device comprising the steps of:
   (a) providing an airplane seat comprising:
      (i) a frame surrounding a holster comprising a peripheral wall defining a pocket for receiving the in-flight entertainment device;
      (ii) an outer housing for receiving the frame;
      (iii) a pivot connection between the frame and the holster for deploying the holster; and
      (iv) a pivot connection for adjusting the tilt or pitch angle of the holster;
   (b) deploying the holster from a stowed position to a deployed position by releasing a latch and pivoting the holster about the pivot connection for deploying the holster to expose the pocket;
   (c) inserting an in-flight entertainment device into the pocket defined by the holster in a viewable position; and
   (d) adjusting the tilt or pitch of the holster by pivoting the frame about the pivot connection for adjusting the tilt or pitch angle of the holster.

* * * * *